United States Patent [19]

Garbacik, Jr. et al.

[11] Patent Number: 5,628,422
[45] Date of Patent: May 13, 1997

[54] WINDSHIELD WIPER RESERVOIR SEALING SYSTEM AND METHOD

[75] Inventors: Robert Garbacik, Jr., Cincinnati; Richard L. Ponziani, Centerville, both of Ohio

[73] Assignee: ITT Automotive Electrical Systems, Inc., Auburn Hills, Mich.

[21] Appl. No.: 672,948

[22] Filed: Jul. 1, 1996

[51] Int. Cl.⁶ ..................... B65D 41/32
[52] U.S. Cl. ............ 220/266; 220/337; 220/338; 220/DIG. 12
[58] Field of Search ............ 220/265, 266, 220/335, 337, 338, 339, 375, 4.22, DIG. 12

[56] References Cited

U.S. PATENT DOCUMENTS

| | | | |
|---|---|---|---|
| 2,958,437 | 11/1960 | Yochem | 220/375 X |
| 4,339,056 | 7/1982 | Berkstresser, Jr. et al. | 220/375 |
| 4,576,308 | 3/1986 | Sullivan | 220/375 X |
| 5,305,900 | 4/1994 | Maguire et al. | 215/245 |
| 5,395,015 | 3/1995 | Bolen, Jr. et al. | 220/338 X |
| 5,529,205 | 6/1996 | Corney et al. | 220/338 X |

*Primary Examiner*—Stephen K. Cronin
*Attorney, Agent, or Firm*—Jacox, Meckstrot & Jenkins

[57] ABSTRACT

A system and method for sealing a windshield washer reservoir is illustrated comprising a one-piece molded cap and strap. The one-piece cap and strap comprises integrally molded and mating hinge members which facilitate hingeably mounting the cap onto the strap after they have been separated from each other. This facilitates providing a sealing system and method having some of the advantages of a one-piece molded construction, while at the same time permitting the user to experience the advantages of a two-piece hinge construction. In another embodiment, an integrally molded cam defining a cam surface and a mating engaging surface are provided which cooperate to not only separate the cap from the strap, but also to cause the pin associated with the cap to be guided into the socket such that when the cap is actuated from an open position to a closed position, the integrally molded cap and strap become separated and substantially simultaneously hingeably mounted together.

21 Claims, 5 Drawing Sheets

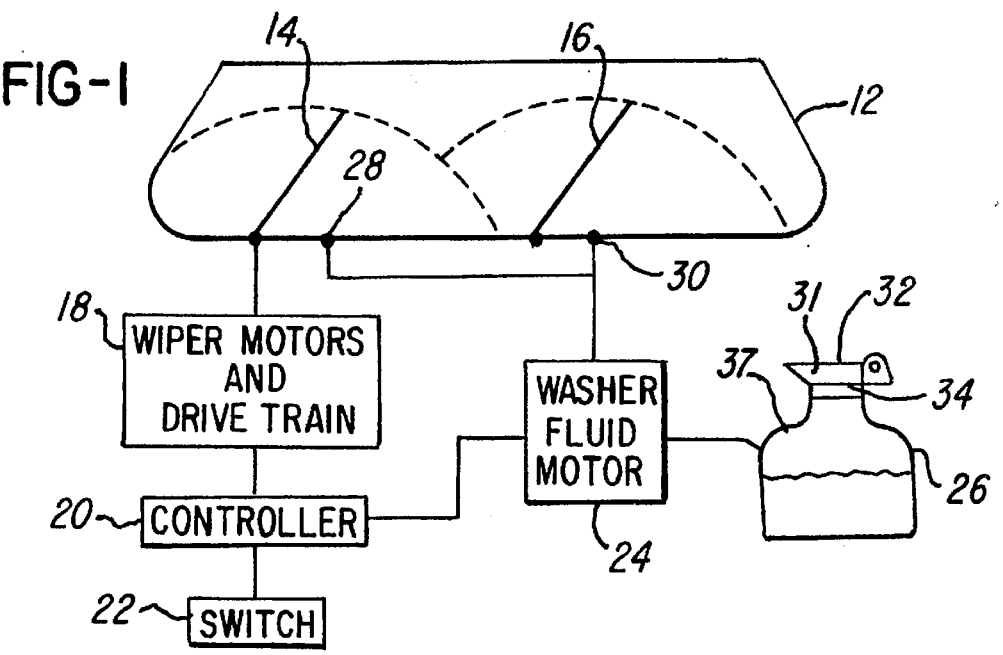
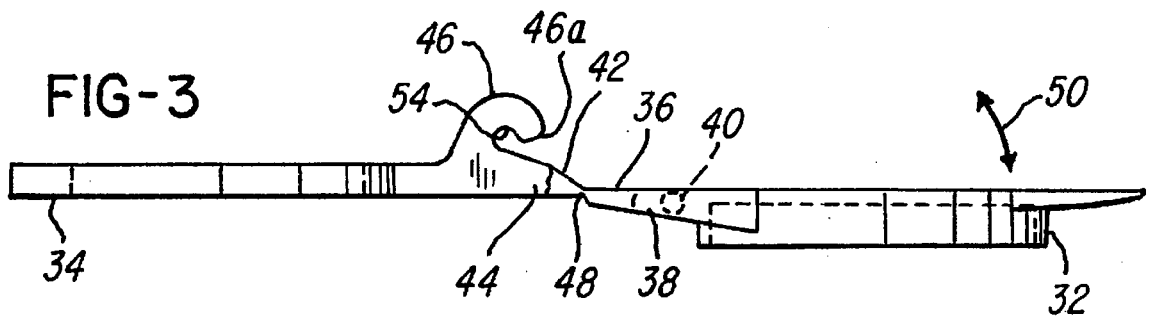
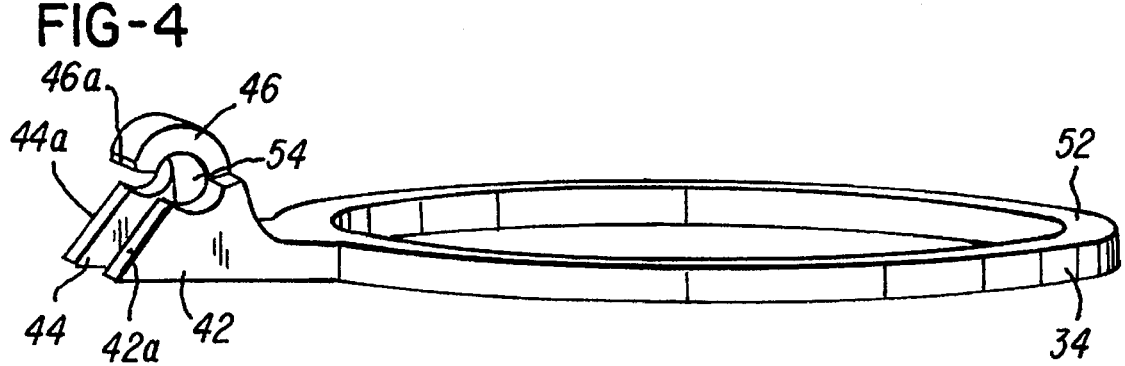

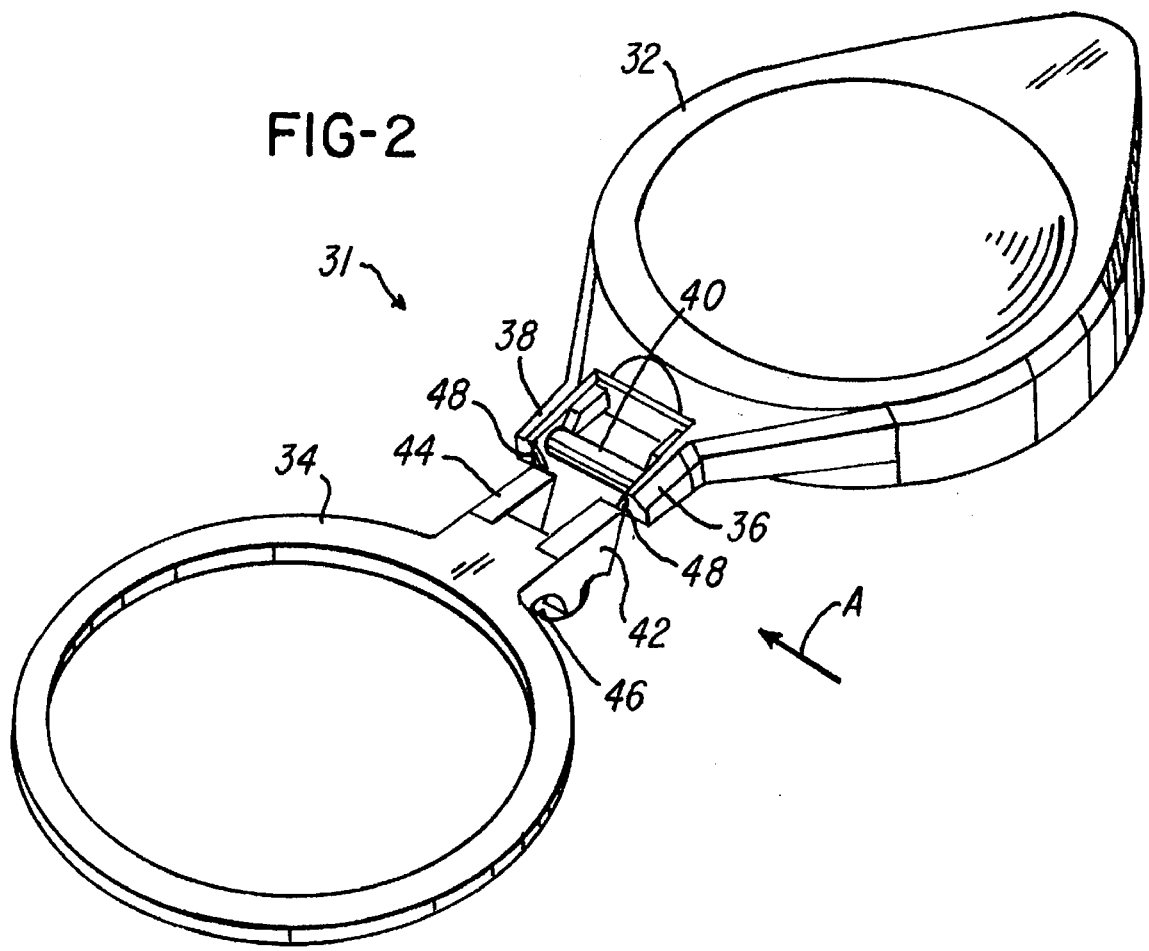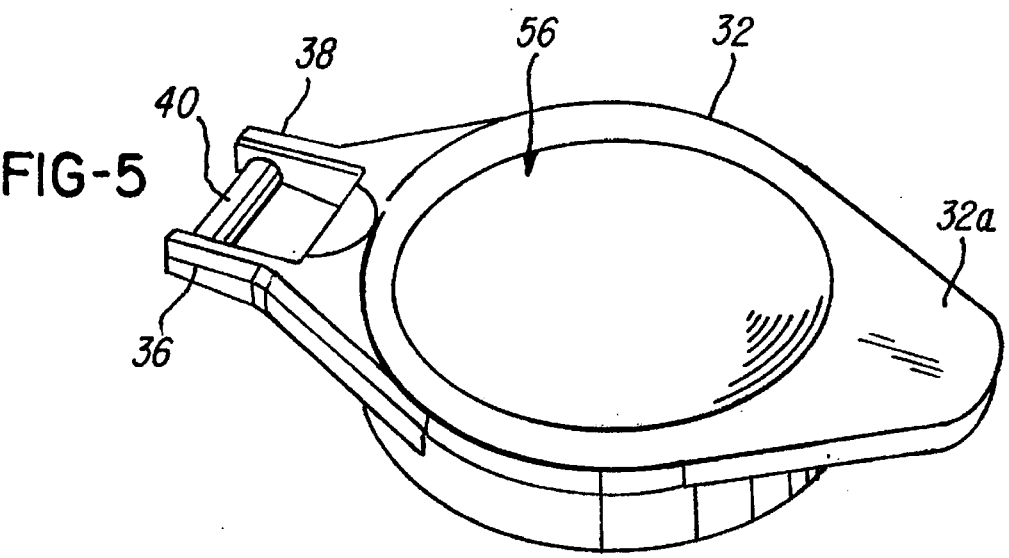

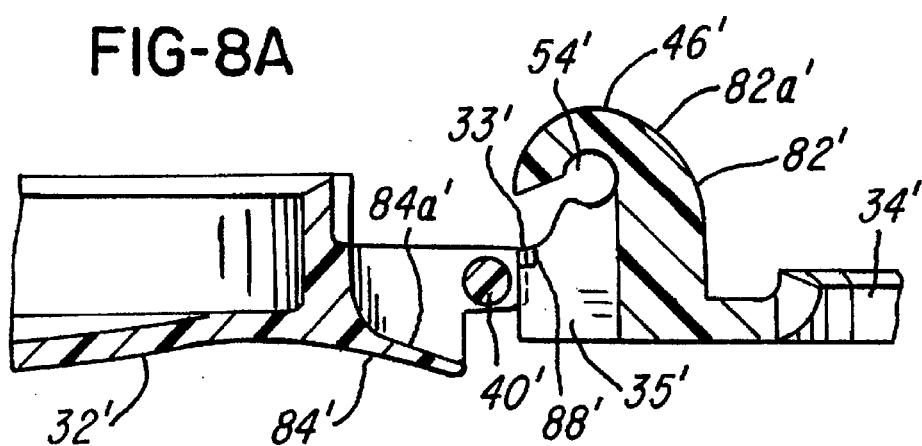
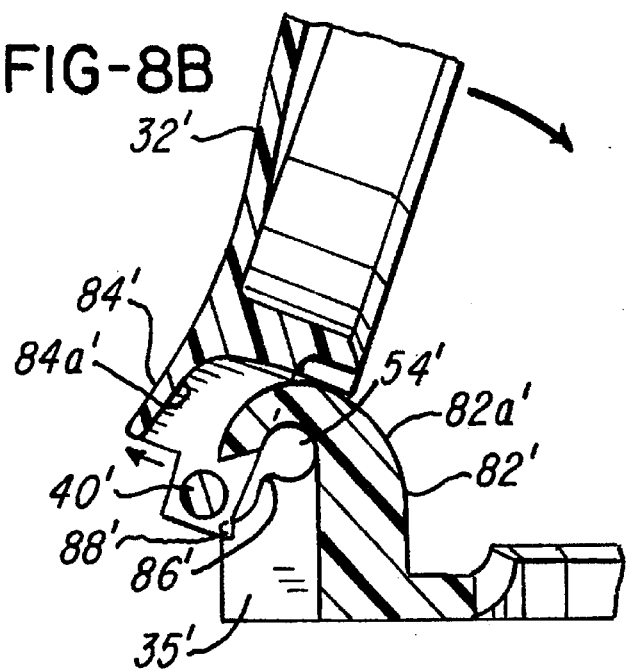
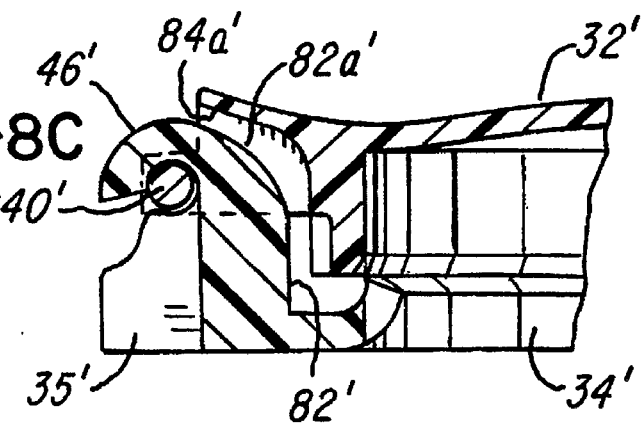

WINDSHIELD WIPER RESERVOIR SEALING SYSTEM AND METHOD

BACKGROUND OF THE INVENTION

1. Field of the Invention

This invention relates to a windshield wiper reservoir sealing system and method and, more particularly, to a integrally molded, one-piece construction cap and strap which may be conveniently separated and hingeably coupled together.

2. Description of Related Art

Traditional reservoir caps for use with windshield washer fluid reservoirs have consisted of a cap that is attached in some way to the neck of the reservoir itself. Often times, this was attained by means of a loop strap molded into the cap and then placed over a neck of a filler opening coupled to the reservoir. With this approach, the cap typically spends most of its time attached to the filler opening of the reservoir. This caused the strap portion of the cap to retain a formation which, when a user performs a fluid refill of the reservoir, caused the cap to get in the way of the filling process. This caused some aggravation and disruption to the consumer and subsequent dissatisfaction from fluid spillage on the cap as well as elsewhere in an engine compartment where the reservoir is situated.

Some prior art systems also comprised a two-piece construction where a cap was hingeably mounted either on the reservoir or around the filler opening. The two-piece construction offers advantages in that the cap does not retain memory and stays open, for example, when a user opens the cap. Unfortunately, the two-piece construction is generally more expensive than a one-piece construction.

What is needed, therefore, is a system and method which provides the advantages of a two-piece construction, yet comprises some of the advantages of a one-piece construction.

SUMMARY OF THE INVENTION

It is, therefore, a primary object of this invention to provide a windshield washer reservoir sealing system and method which comprises the advantages of a two-piece construction with the simplicity of a one-piece constructed cap.

It is another object of this invention to provide a system and method for providing a cap and a strap which is an integral one-piece construction and which, when actuated from an open position to a closed position becomes separated and substantially simultaneously hinged together.

Another object of this invention is to provide a one-piece molded construction cap and retention strap comprising a line of weakness which facilitates separating the cap from the strap such that the two pieces may be easily separated, for example, at the point of assembly, and subsequently hingeably coupled together to provide a working hinge that performs well for the consumer.

In one aspect, this invention comprises a retention strap for coupling to a washer fluid reservoir, the retention strap comprising a hinge member integrally molded therein, a cap for mounting a neck of the reservoir, the cap comprising a second hinge member integrally molded to the cap for hingeably the hinge member to the cap to permit the cap to hinge between an open and a closed position where the cap becomes mounted on the neck, the retention strap and the cap being a one piece molded construction and comprising a break line therebetween such that, when a predetermined pressure is applied to the retention strap and the cap, the hinge member may be detachably coupled to the second hinge member.

In another aspect, this invention comprises a reservoir having a neck, a retention strap for mounting on the neck, the retention strap comprising a hinge member integrally molded therein, a cap for mounting on the neck of the reservoir, the cap comprising a second hinge member integrally molded to the cap for hingeably the hinge member to the cap to permit the cap to hinge between an open and a closed position where the cap becomes mounted on the neck, the retention strap and the cap being a one piece molded construction and comprising a break line therebetween such that, when a predetermined pressure is applied to the retention strap and the cap, the hinge member may be detachably coupled to the second hinge member.

In still another aspect, this invention comprises a controller for controlling the operation of the windshield wipers, a wash switch coupled to the controller for causing the windshield wiper system to go into a wash cycle, a set of windshield wipers associated with a windshield, a driver coupled to the set of windshield wipers and the controller for actuating the set of windshield wipers when a user activates the wash switch, a reservoir for storing windshield wiper fluid, a wash fluid pump coupled to the reservoir for pumping fluid from the reservoir to the windshield in response to a signal from the controller, a seal coupled to the reservoir for sealing the reservoir, the seal being a one-piece molded construction comprising a reservoir mount for mounting on the reservoir, a reservoir cap for hingeably mounting to the reservoir mount such that the reservoir cap may be actuated from an open position to a sealed position where the reservoir becomes sealed, the reservoir mount and the reservoir cap being integrally formed in a one-piece construction and comprising a line or weakness therebetween, the reservoir mount comprising a first hinge member and a reservoir cap comprising a second hinge member for mating with the first hinge member after the reservoir mount and the reservoir cap have been separated along the line of weakness.

In yet another aspect, the invention comprises a method comprising the steps of providing a reservoir for storing the windshield washer fluid, providing an integrally molded cap and mount, mounting the mount onto the reservoir, separating the cap from the mount, and hingeably mounting the cap to the mount.

These and other objects and advantages of the invention will be apparent from the following description, the accompanying drawings and the appended claims.

BRIEF DESCRIPTION OF THE DRAWINGS

FIG. 1 illustrates a windshield wiper system in accordance with an embodiment of this invention;

FIG. 2 is view illustrating a one-piece constructed cap and strap;

FIG. 3 is a fragmentary view taken in the direction of arrow A in FIG. 2 illustrating a hinge situated on a retention strap as well as a line of weakness which facilitates separating the cap from the strap;

FIG. 4 is a view illustrating various features of the retention strap;

FIG. 5 is a view illustrating various features of the cap;

FIGS. 8a–8c is a view of a hinge in accordance with another embodiment of the invention illustrating a cam action which causes the cap to be severed from the strap and simultaneously causes the pin to be guided and mounted in a mating socket to hingeably secure the cap to the strap.

DETAILED DESCRIPTION OF THE PREFERRED EMBODIMENT

Figure 6:
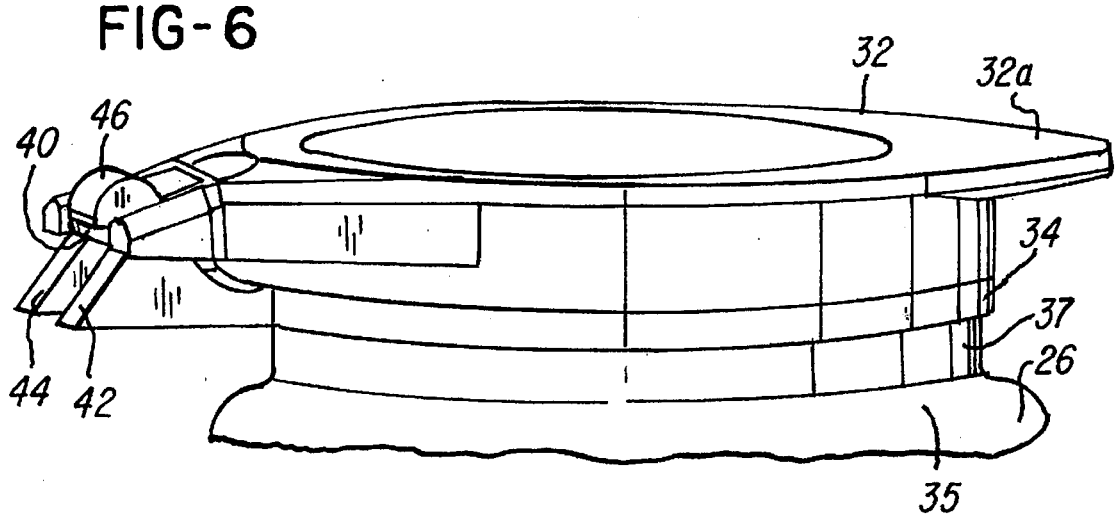
FIG. 6 is a fragmentary view illustrating the cap situated on a filler opening of a neck of a reservoir and showing the cap hingeably mounted thereto and in a closed position.

Referring now to FIG. 1, a windshield wiper system 10 is shown for wiping and cleaning a windshield 12. The windshield wiper system 10 comprises a plurality of windshield wipers 14 and 16 which are driven by suitable wiper motors and wiper drive train 18. The windshield wiper system 10 further comprises a controller 20 for controlling the operation of the wiper system 10 and the wiper motors and drive train 18 in response to actuation of a switch 22 which is positioned, for example, on a turn signal lever (not shown) in a passenger compartment (not shown) of a vehicle (not shown).

The windshield wiper system 10 also comprises a washer fluid motor 24 which is coupled to controller 20. The washer fluid motor 24 pumps washer fluid from a reservoir 26 to output orifices 28 and 30 associated with wiper blades 14 and 16, respectively, in response to a wash signal from controller 20 which is generated when a user actuates switch 22 to a wash cycle position.

Notice that the reservoir 26 comprises reservoir sealing system 31 comprising a cap 32 which is hingeably mounted on a strap 34 which is situated on a neck 37 of reservoir 26 in a manner described later herein.

As best illustrated in FIG. 2, the reservoir sealing system 31 comprises the retention strap 34 which is integrally molded to cap 32 in a one-piece construction. As illustrated in FIG. 2, the cap 32 comprises a first pin support 36 and a second pin support 38 which cooperates with the first pin support 36 to support a pin 40 therebetween.

Similarly, the strap 34 comprises a first hinge support 42 and a second hinge support 44 for supporting a hinge 46 (FIGS. 3 and 4) which may be hingeably mounted onto pin 40 in a manner described later herein.

Notice in FIG. 3 that a break line or line of weakness 48 separates the cap 32 from strap 34. It has been found that this break line or line of weakness 48 facilitates separating cap 32 from strap 34 when the cap is pulled away from strap 34 or, alternatively, when cap 32 is pivoted in the direction of double-arrow 50 (FIG. 3) after strap 34 is mounted onto neck 36 of reservoir 26.

In the embodiment being described, a predetermined pressure is applied to separate cap 32 from strap 34. In the embodiment being described, this predetermined pressure is less than ten pounds and on the order of about five to seven pounds. The break line or line of weakness 48 typically comprises a width and thickness of less than 5.0 mm and, in the embodiment being described, the thickness is less than about 3.0 mm and the line of weakness 48 comprises a width of about 2.0 mm.

As best illustrated in FIG. 4, the strap 34 comprises a generally cylindrically collar 52 which is received on a filler opening 35 (FIG. 6) of a neck 37 of reservoir 26. Notice in FIG. 4 that the first and second hinge supports 42 and 44 are formed to comprise a beveled edge 42a and 42a, respectively. Likewise, hinge 46 also comprises a beveled edge 46a (FIG. 3) which cooperates with beveled edges 42a and 42a to enable the pin 40 on cap 32 to be slid or guided into socket or aperture 54 so that cap 32 may be hingeably mounted thereto.

In the embodiment being described, the strap 34 is integrally molded from a plastic resilient material suitable for permitting strap 34 to be mounted onto neck 36 of reservoir 26 and also being resilient to permit hinge 46 to flex towards and away from members 42 and 44 when the pin 40 is situated in aperture 54.

Notice in FIG. 5 that cap 32 comprises an integrally molded indicia 56 for identifying the fluid in the reservoir 26. Cap 32 also comprises a handle area 32a for facilitating gripping the cap when the cap is separated from strap 34 and also for facilitating hinging cap between an open and closed position after cap 32 is mounted on reservoir 26.

FIG. 6 illustrates the strap 34 mounted in a closed position on filler opening 35 of neck 37 after the cap 32 has been detached from the strap 34, hingeably mounted onto hinge 46 (i.e., after pin 40 has been situated in hinge 46), and then moved to a closed position where the cap 32 seals the reservoir 26. It should be appreciated that the cap 32 may be threaded, bayonet mounted or simply snapped into place as may be necessary depending on the shape of the filler opening 35.

Figure 7:
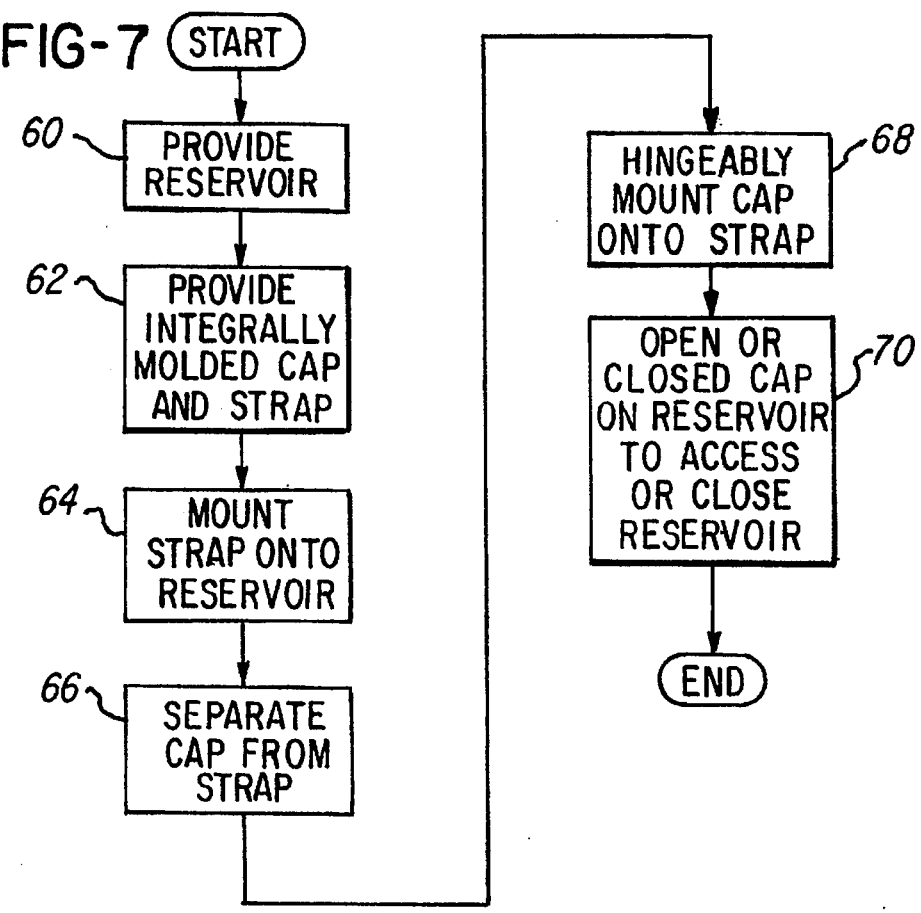
FIG. 7 is a schematic view of a method in accordance with an embodiment of the invention.
Figure 9:
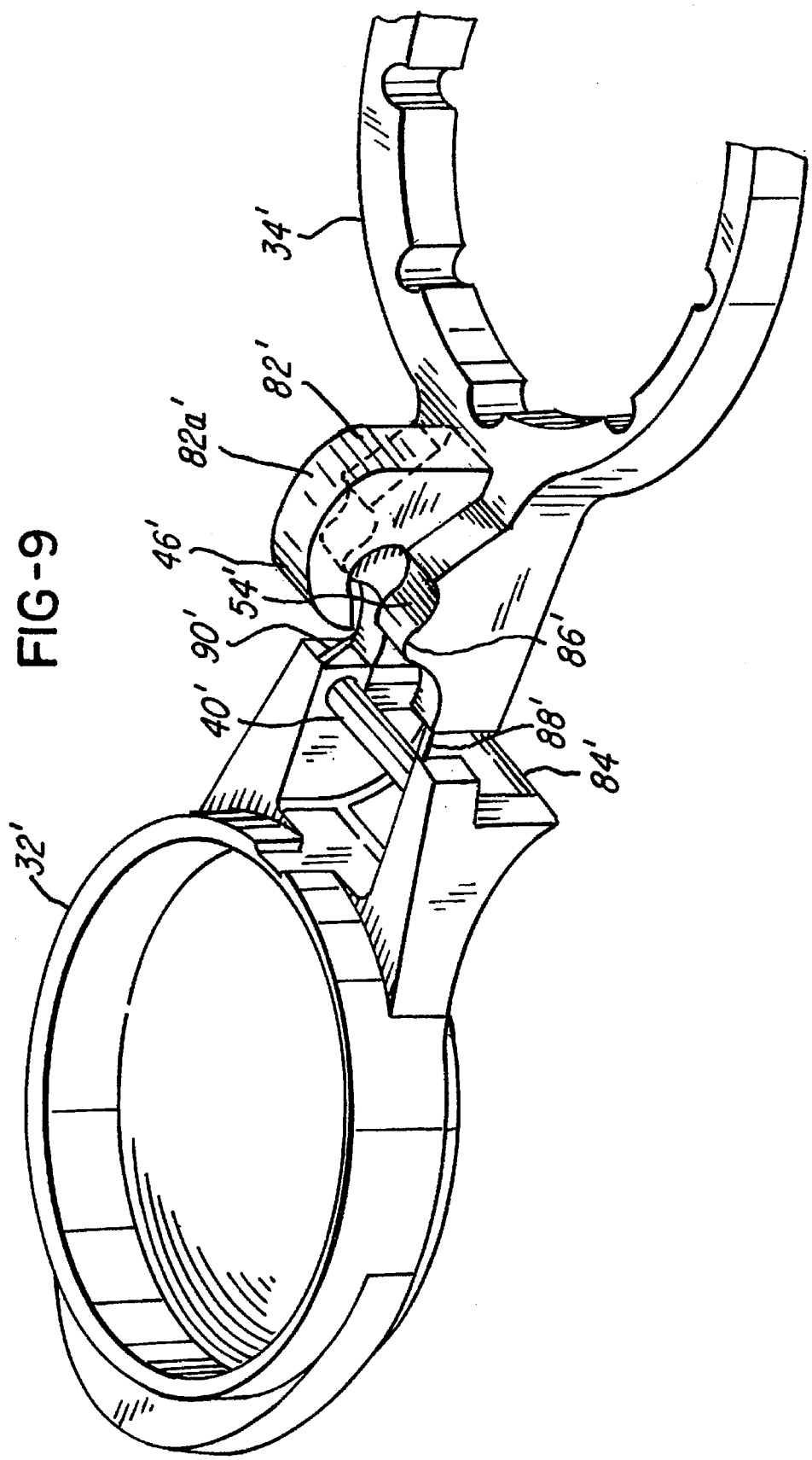
FIG. 9 illustrates more details of the breakaway points and weak points associated with the hinge shown in FIGS. 8a–8c.

FIG. 7 illustrates a method of utilizing features of the present invention wherein the method begins at block 60 by providing a reservoir for receiving, for example, windshield washer fluid. At block 62, the integrally molded one-piece construction cap 32 and strap 34 are provided. At block 64, the strap 34 is situated about filler opening 35 of neck 36 of reservoir 26. At this point, the cap 32 is separated from strap 34 along the line of weakness 48 (block 66). The cap 32 is separated from strap 34 by, for example, pulling cap 32 away from cap 34 or rocking cap 32 in the direction of double arrow 50 (FIG. 3) so that the cap 32 bends along the line of weakness 48 until cap 32 is separated from strap 34.

Once the cap 32 is separated from strap 34, the pin 40 is positioned and moved along surfaces 42a and 42a (FIG. 4) and ultimately forced into aperture 54 where the cap becomes hingeably mounted to strap 34 (block 68).

At block 70, the cap can be opened or closed on reservoir 26 to provide access to or to seal, respectively, reservoir 26 as desired.

FIGS. 8a–8c and 9 is another embodiment of the invention, illustrating various details of a hinge and cam action in accordance with another embodiment of the invention. In this embodiment, those parts which are the same as the parts described above relative to FIGS. 1–7 have the same part number with the addition with a "'" mark added thereto.

As best illustrated in FIG. 8a–8c, a hinge coupler comprises hinge 46' and pin 40'. Notice that the hinge 46' prime comprises an integrally formed cam 82' having a cam surface 82a'. The cap 32' comprises an integrally molded engaging member 84' having an engaging surface 84a'. This engaging surface 84a' engages cam surface 82a' when the cap 32' is actuated from an open position (FIG. 8a) to an intermediate position (FIG. 8b) and, subsequently, to a closed position (FIG. 8c).

Notice that the cam surface 82a' and the engaging surface 84a' are arcuately shaped, and surface 84a' engages and rides along cam surface 82a' as the cap 32' is actuated or moved to the closed position. It should be appreciated that other cam surface shapes may be selected to facilitate achieving the separation and mounting achieved by the present invention.

As illustrated in FIG. 8b, as engaging surface 84a' moves along cam surface 82a', the pin 40' is caused to be moved into socket or aperture 54' As the cap is moved to the closed position, the breakaway points 88' and 90' (FIG. 9) bend and become fatigued. The cam action causes the cap end 33' (FIG. 8a) to separate from the strap end 35'.

As the cap 32' is moved to the closed position relative to the strap 34', the pin 40' is drawn by the camming action into socket 54' substantially simultaneously as the cap 32' separates from strap 34'.

At this point, the cap 32' may be mounted to the reservoir 26' by screwing the cap 32' to the neck 37', bayonet mounting the cap 32' to the neck 37' or "snapping" the cap 32' on the neck 37', as is necessary depending on the neck.

Advantageously, it should be appreciated that this embodiment provides a one-piece constructed integrally molded cap and strap which has the advantages of a two-piece construction. Advantageously, the method of this embodiment provides a simple one-step method for separating and mounting the cap to the strap when the strap is situated on reservoir 26 (FIG. 1) and after the cap has been actuated to the closed position.

Advantageously, the system and method of this invention provides advantages of providing a cap 32 and strap 34 which are molded in a one-piece construction and which are later separated and hingeably coupled together such that the user can realize advantages of a two-piece construction.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A windshield washer cap comprising:
   a retention strap for coupling to a washer fluid reservoir, said retention strap comprising a hinge member integrally molded therein;
   a cap for mounting to a neck of said reservoir, said cap comprising a second hinge member integrally molded to said cap for hingeably connecting said hinge member to said cap to permit said cap to hinge between an open and a closed position where said cap becomes mounted on said neck;
   said retention strap and said cap being a one piece molded construction and comprising a break line therebetween such that, when a predetermined pressure is applied to said retention strap and said cap, said hinge member may be detachably coupled to said second hinge member.

2. The windshield washer cap as recited in claim 1 wherein said break line comprises a width of less than 5.0 mm.

3. The windshield washer cap as recited in claim 1 wherein said break line comprises a thickness of less than about 3.0 mm and a width of less than about 2.0 mm.

4. The windshield washer cap as recited in claim 1 wherein said hinge member comprises at least one socket.

5. The windshield washer cap as recited in claim 1 wherein said strap is generally circular and mounts directly onto said neck.

6. The windshield washer cap as recited in claim 1 wherein said predetermined pressure is less than 10 pounds.

7. The windshield washer cap as recited in claim 6 wherein said second hinge member comprises a pin for receiving said socket.

8. The windshield washer cap as recited in claim 1 wherein said break line comprises a thickness of less than 5.0 mm.

9. The windshield washer cap as recited in claim 8 wherein said break line comprises a width of less than 5.0 mm.

10. The windshield washer cap as recited in claim 1 wherein said cap comprises a separator for causing said cap and said retention strap to separate when said cap is actuated from the open position to the closed position.

11. The windshield washer cap as recited in claim 10 wherein said separator comprises a cam surface integrally formed in either said cap or strap and an engaging surface integrally formed in the other of said retention strap or said cap, respectively, such that when said cap is actuated to the closed position, said engaging surface engages said camming surface to cause said cap to be separated from said strap.

12. The windshield washer cap as recited in claim 11 wherein said second hinge member is a pin and said hinge member comprises a socket,
   said cam surface being shaped to cause said pin to be guided into said socket when said cap is actuated from said open position to said closed position.

13. The windshield washer cap as recited in claim 12 wherein said cam surface is arcuately shaped in cross section.

14. A fluid storage system comprising:
   a reservoir having a neck;
   a retention strap for mounting on said neck, said retention strap comprising a hinge member integrally molded therein;
   a cap for mounting on said neck of said reservoir, said cap comprising a second hinge member integrally molded to said cap for hingeably connecting said hinge member to said cap to permit said cap to hinge between an open and a closed position where said cap becomes mounted on said neck;
   said retention strap and said cap being a one piece molded construction and comprising a break line therebetween such that, when a predetermined pressure is applied to said retention strap and said cap, said hinge member may be detachably coupled to said second hinge member.

15. The fluid storage system as recited in claim 14 wherein said predetermined pressure is less than 10 pounds.

16. The fluid storage system as recited in claim 14 wherein said break line comprises a thickness of less than 5.0 mm.

17. The fluid storage system as recited in claim 14 wherein said break line comprises a thickness of less than about 3.0 mm and a width of less than about 2.0 mm.

18. The fluid storage system as recited in claim 14 wherein said break line comprises a width of less than 5.0 mm.

19. The fluid storage system as recited in claim 18 wherein said break line comprises a width of less than 5.0 mm.

20. The fluid storage system as recited in claim 14 wherein said hinge member comprises at least one socket.

21. The fluid storage system as recited in claim 20 wherein said second hinge member comprises a pin for receiving said socket.

* * * * *